United States Patent [19]
Tangorra et al.

[11] 3,877,503
[45] Apr. 15, 1975

[54] METHOD FOR ANCHORING A PNEUMATIC TIRE TO THE RIM AND PNEUMATIC WHEEL SO OBTAINED

[75] Inventors: Giorgio Tangorra; Italo Bertelli, both of Milan, Italy

[73] Assignee: Industrie Pirelli, S.p.A., Milan, Italy

[22] Filed: May 22, 1973

[21] Appl. No.: 362,666

[30] Foreign Application Priority Data
May 31, 1972 Italy.................................. 25139/72

[52] U.S. Cl............... 152/379; 152/362 R; 152/381
[51] Int. Cl........................................... B60c 15/02
[58] Field of Search ........... 152/375, 379, 309, 381, 152/384, 386, 387, 388, 395, 397, 398, 304, 362, 362 R; 301/5 R

[56] References Cited
UNITED STATES PATENTS
1,939,935  12/1933  Wagenhorst...................... 152/198
FOREIGN PATENTS OR APPLICATIONS
65,949  3/1892  Germany............................. 152/386

Primary Examiner—Drayton E. Hoffman
Attorney, Agent, or Firm—Stevens, Davis, Miller & Mosher

[57] ABSTRACT

A pneumatic wheel for vehicles including a tire provided with a tread, two sidewalls and two beads and a rim with two seats, one for each bead. Each seat has the shape of a circumferential channel having an opening for the introduction of each bead in its seat. The width of the opening is smaller than the maximum width of the seat. Each bead has in cross-section a profile at least partially equal to that of the corresponding seat of the rim and is substantially indeformable. The cross-section of the bead is smaller than the cross-section of the seat. Each bead is locked in its seat by an element having a modulus of resistance to compression of the same order of magnitude as that of the compound forming the beads and which makes coincident the partially equal profiles. The tire is anchored to the rim by introducing the element into the seat on the rim after the introduction of the bead so as to press the surface of the bead against the surface of the corresponding seat.

9 Claims, 7 Drawing Figures

METHOD FOR ANCHORING A PNEUMATIC TIRE TO THE RIM AND PNEUMATIC WHEEL SO OBTAINED

The present invention relates to pneumatic tires for vehicle wheels, and more particularly the anchorage of the pneumatic tire to the rim.

Pneumatic tires, commonly called "tires," are in general formed by a tread and two sidewalls, each sidewall of which terminates with a zone called "bead"; the bead being the tire portion intended to be fitted to the rim in order to constitute a single assembly which is called "pneumatic wheel."

The most common system of assembling the tire on the rim consists in forcing the bases of the beads on two conical surfaces at the sides of the rim, having an outer diameter greater than the inner diameter of the bead by inflating the tire. Upon inflation of the tire the beads are strongly pressed against the conical surfaces, and the friction generated between the two parts results in anchoring the two elements.

It is evident that in an assembly of this type, the two elements may detach from each other if, for any incidental reason, the inflation pressure is lost.

In some cases a need was felt for a firm anchorage between the tire and the rim even in the absence of inflation pressure. The reasons for said need can be several. One reason, for instance, resides in the fact that it is desirable to maintain a certain connection between the tire and the rim, following a blowout, in order to permit an easier control of the vehicle.

Another reason is in the employment of special tires which work at very low pressures in order to run on very irregular ground. In that case the inflation pressure can be insufficient to ensure an efficient anchorage between the tire and the rim.

Different solutions have been proposed to solve this problem, for instance, the provisions of particular profiles of rim having a ridge at the bead-toe so as to prevent the bead itself from displacing from its seat, the bonding of the tire to the rim by means of appropriate adhesive agents, or the anchorage obtained by means of auxiliary rings, nuts and bolts.

However, the known solutions have not proven satisfactory because of their complicated construction, insufficient efficiency, or high cost.

The present invention aims at providing a firm anchorage of the pneumatic tire on the rim, which is of simple construction and economical.

Accordingly, the object of the present invention is a pneumatic wheel for vehicles, which comprises a tire provided with a tread, two sidewalls and two beads, and a rim with two seats, one for each bead. The rim is characterized in that each seat has the shape of a circumferential channel having an opening for the introduction of each bead in the respective seat with the width of the opening being smaller than the maximum width of the seat. Each bead has in cross-section a profile at least partially equal to that of the corresponding seat of the rim and substantially indeformable, the cross-section being smaller than the cross-section of the seat. Each bead is locked in its own seat by means of an additional forcing element which makes coincident said partially equal profiles, and the material of the additional element having a modulus of resistance to compression which is of the same order as that of the compound forming the beads or higher than it.

A further object of the present application is a method for anchoring a tire to a rim to form a pneumatic wheel for vehicles, characterized in that it comprises the steps of introducing each bead in the corresponding seat provided in the rim, the seat having the shape of a circumferential channel with an opening of a width smaller than the maximum width of the seat, the bead having a cross-section smaller than the cross-section of the corresponding seat; and locking the bead in its own seat by introducing in the latter an additional forcing element which presses the surface of the bead against the surface of the corresponding seat.

The above described invention is applicable to conventional tires already known. However, it is particularly advantageous if applied to the tire described in U.S. Ser. No. 273,337 filed July 19, 1972 now U.S. Pat. No. 3,805,868.

In fact, a tire whose sidewalls are prevailingly under compression, is particularly suitable for the type of anchorage forming the object of the present invention.

The present invention will be better illustrated from the following description, made with reference to the attached drawings, in which:

FIG. 1 represents in cross-section a bead 1 which, in the example, is formed only by a rubber compound having a hardness of about 70 Shore, without any auxiliary reinforcement.

The bead is inserted in the appropriate seat of a rim 2 constituted by the coupling of the rim flange 3 with an auxiliary ring 4 arranged in an axially inner position with respect to said flange 3.

Figure 7:
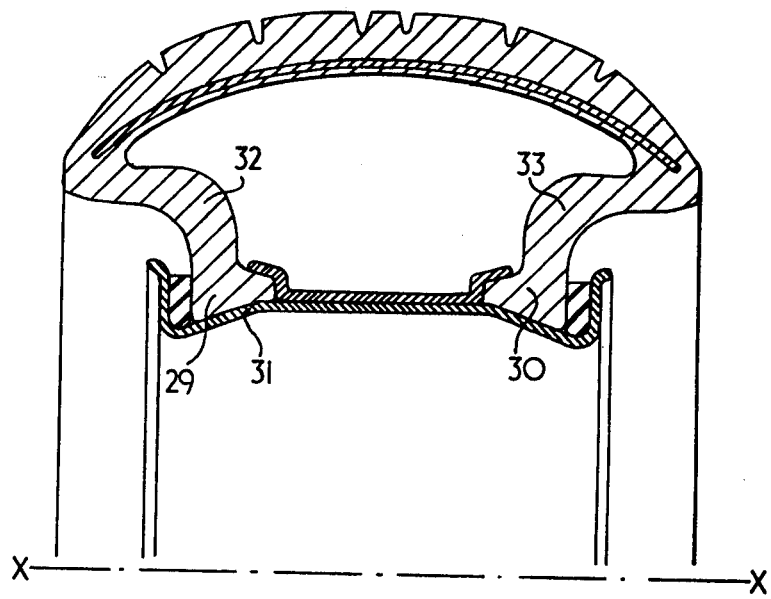
FIG. 7 represents the cross-section of a pneumatic wheel according to the present invention.

Auxiliary ring 4 is permanently connected to the rim 2, for instance by welding or bolts (not represented in the figure) and is provided with an appendage 5 which extends in the direction of the flange 3 to form the opening, of width a, of the seat intended to receive the bead, the opening being turned in a radially outer direction with respect to the axis of rotation of the pneumatic wheel, as shown in FIG. 7.

The seat extending for the whole circumferential development of the rim has therefore an opening, whose width a is smaller than the maximum width b of the seat itself. However, the width a is sufficient to allow the introduction of a bead 1 of width c, also by virtue of a possible slight elastic deformation of the bead itself.

Since the bead 1 is fully constituted by a rubber compound without any conventional textile reinforcement, it is circumferentially extensible, and its radially inner diameter can easily overcome the radially outermost diameter of the flange 3, by means of normal levers commonly used for the fitting of known tires.

The bead 1 has a shape analogous to that of the corresponding seat constituted by the flange 3 and by the auxiliary ring 4, although the area of cross-section of the bead is smaller than the corresponding area of the seat, so that, when the bead is introduced, through the opening, into its seat, it is not locked in it.

To obtain the anchorage of the bead in its own seat, the additional forcing element 7 is subsequently inserted between the flange 3 and the axially outer surface 6 of the bead 1. The element 7 pushes the bead 1 against the axially inner surface of the corresponding seat.

Preferably, the insertion of the additional element is carried out by points or portions along the circumferential development of the rim, and this in order to localize the strain of penetration between the flange 3 and the bead 1.

In this way the bead 1 is firmly secured in its seat and is not allowed to come out therefrom by the presence of the appendage 5 of the auxiliary ring 4.

Figure 1:
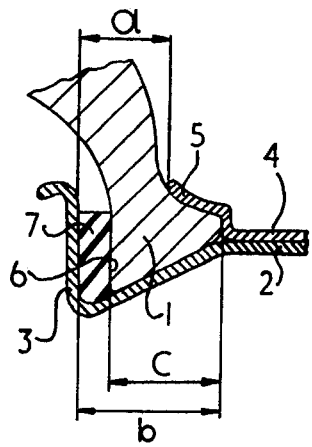
FIG. 1 represents in cross-section a bead and a rim fitted together in accordance with the present invention.

In the example illustrated in FIG. 1 the additional forcing element 7 is constituted by a ring made of a rubber compound having a hardness of about 80 Shore and a nearly rectangular section, substantially inextensible to overcome the outer diameter of the flange 3.

However, the additional element could be constituted by a series of sector-shaped members arranged along the whole circumferential development of the rim seat and spaced apart from one another. In that case the material forming said additional element could be a synthetic polymer, as for instance nylon, or also metal.

The value of the section width of the additional element is obviously greater than the difference between the width of seat $b$ and the width of bead $c$. The forcing of the bead into its seat or, more precisely, in the case illustrated in FIG. 1, the axial thrust imparted to the bead against the axially inner profile of the seat into which it is encased depends in fact on that value.

Experience has shown that, to obtain a good anchorage of the bead in its seat, the value of the section width of the additional element must be greater than value $b-c$ by such a quantity as to originate a reduction in the axial dimension of the bead equal to at least 5 percent.

Figure 2:
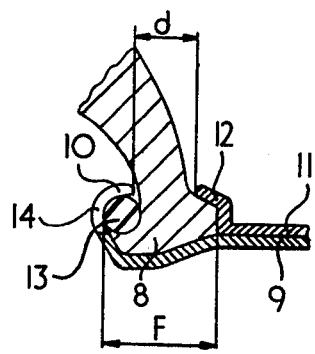
FIGS. 2, 3, 4, 5 and 6 represent respectively in cross-section as many alternative embodiments of a bead and a rim fitted together according to the present invention.

FIG. 2 represents an alternative embodiment of the present invention in which a bead 8, made by a rubber compound only is inserted into the appropriate seat of a rim 9, constituted by the coupling of the flange 10 of the rim with an auxiliary ring 11 arranged in an axially inner position with respect to the flange 10. The auxiliary ring 11 is connected to the rim 9 by means of welding or bolts (not shown in the figure) and is provided with an appendix 12 extending in the direction of the flange 10.

The radially outer portion of flange 10 is bent in the direction of the appendage 12. In this way the distance $d$ between the flange 10 and the appendage 12 constitutes the opening of the seat intended to receive the bead 8, which extends along the whole circumferential development of the rim.

As the seat has a maximum width F greater than $d$, it also has two undercuts, within which is positioned the bead 8.

The profile of the bead 8 is for the greater part equal to that of the seat intended to receive it, except in the zone which has to encase the additional forcing element 13. Element 13 has a cross-section of circular form and dimensions greater than the space intended to receive it to obtain the desired forcement of the bead against the inner surfaces of the rim seat.

Element 13, introduced in the rim seat, presses the bead 8, both in radial direction and in axial direction, against the inner surface of its own seat, ensuring therefore the locking of the same.

In the example of FIG. 2 the additional forcing element 13 is constituted by a ring of a rubber compound having a hardness of 85 Shore and circumferentially extensible to overcome the outer diameter of the flange 10. However, the rubber ring can be replaced by a series of sectors, made of metal or of nylon, placed near to one another and having the same cross-section as the rubber ring.

The flange 10 of the rim 9 can be provided with a radial slit 14 (or with a plurality of slits uniformly distributed along its circumference), having a width sufficient to allow the introduction of a hook to enable one to remove the rubber ring 13 (or each sector-shaped element) for disassembling the tire from the rim.

Figure 3:
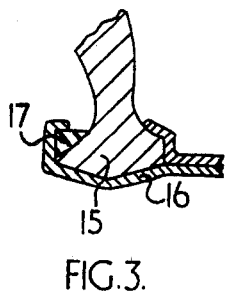
Figure 4:
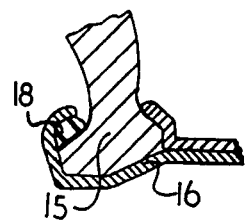
Figure 5:
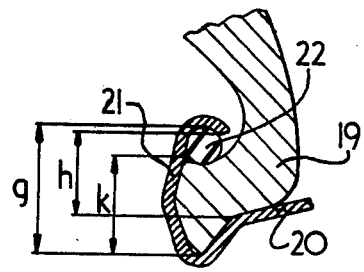

FIGS. 3 and 4 illustrate further alternative embodiments of the present invention, quite analogous to that shown in FIG. 2, in which, owing to the different profile of the bead 15 and of the seat of the rim 16 intended to encase it, it is preferable to adopt additional forcing elements 17 having a cross-section of triangular shape, or additional forcing elements 18 having a cross-section of semi-circular shape. FIG. 5 represents in cross-section a further alternative embodiment of the present invention. The bead 19, constituted only by a rubber compound, without any auxiliary reinforcement, is inserted in the appropriate seat of a rim 20.

The seat is completely obtained by an appropriate bending of the flange 21 carried out in such a way that the maximum width $q$ of the seat is greater than the width $h$ of its own opening, the width $h$ being such as to allow the passage of the thickness K of the bead 19 to be encased in the seat, if necessary by virtue of a possible slight elastic deformation of the bead itself.

The seat intended to receive the bead 19 extends along the whole circumferential development of the rim, and has its opening turned towards the inner concavity of the pneumatic wheel.

The bead 19 has a profile partially corresponding to that of the rim seat, except in the zone intended to receive the additional forcing element 22, which in this example is constituted by a rubber ring of circular section, circumferentially extensible to exceed the radially outermost diameter of the flange 21.

However, like in the example of FIG. 1, the additional element can be constituted by a series of sector-shaped members arranged along the whole circumferential development of the rim seat and spaced apart from one another. It is evident that in such case said members need not be longitudinally extensible.

The area of the cross-section of the bead 19 is smaller that the corresponding area of the seat intended to receive it. Therefore, when the bead is introduced, through the opening, into its own seat, it is not locked in it.

To carry out the anchorage of the bead in its own seat, the additional forcing element 22 is inserted. This pushes the bead 19 in radial direction, compressing it against the radially innermost profile of the seat. In this way the bead 19 is firmly secured in its own seat and can not come out therefrom because of the presence of the two undercuts obtained at the opening of width $h$.

Figure 6:
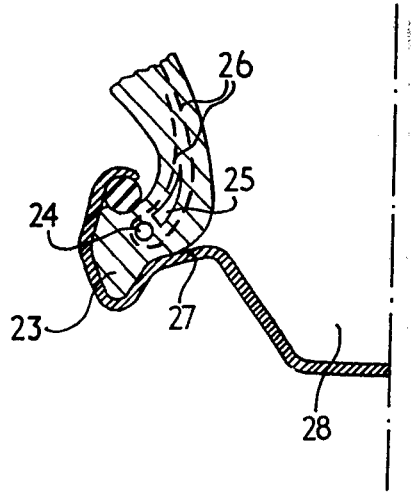

FIG. 6 represents an alternative embodiment of FIG. 5, in which the bead 23 comprises a normal bead core 24, circumferentially inextensible, and a filler 25. The carcass ply 25 is wound up about elements 26.

In this embodiment the rim 27 is provided with a central channel 28 which extends along its whole circumferential development to allow the fitting of the bead 23 in its own seat.

FIG. 7 represents in cross-section a complete tire, whose beads 29 and 30 are secured to the rim 31 according to the embodiment illustrated in FIG. 1 of the present invention. The tire is of the type described in U.S. Serial No. 273,337 and, as stated above, is particularly suitable to carrying out the present invention, since its sidewalls 32 and 33 work prevailingly under compression during the tire service.

In all of the above illustrated examples it is always possible to detach the tire from the rim by removing the additional forcing element from the rim seat, which operation is made possible by the use of appropriate tools already known per se, which are adopted for fitting and unfitting normal tires.

It is understood that the above reported examples are not limiting in character and that the present invention includes any other alternative embodiment deriving from the above indicated inventive concept.

What is claimed is:

1. A pneumatic wheel for vehicles, which comprises:
   a tire provided with a tread, two sidewalls, and two beads,
   a rim with two seats, one for each bead, each seat having the shape of a circumferential channel with an opening for the introduction of each bead in the respective seat, the two ends of said opening being directed the one against the other, whereby the width of said opening is smaller than the maximum width of said seat, each bead having in cross-section a profile at least partially equal to that of the corresponding seat of the rim and substantially indeformable, said cross-section being smaller than the cross-section of said seat, and
   an additional forcing element being inserted between the outermost end of said opening and an underlying portion of the bead, whereby said two ends of the opening surround on one side at least a part of said cross-sectional profile of the bead to lock said bead in its own channel, the material of said additional element having a modulus of resistance to compression which is of the same order as that of the compound forming the beads or higher than it.

2. The pneumatic wheel as in claim 1, in which the additional element is constituted by a circumferentially extensible ring.

3. The pneumatic wheel as in claim 1, in which the additional element is constituted by a series of sector-shaped members arranged in circumferential direction and spaced apart from one another.

4. The pneumatic wheel as in claim 2, in which the material forming said additional element is a rubber compound.

5. The pneumatic wheel as in claim 3, in which the material forming said additional element is a synthetic polymer.

6. The pneumatic wheel as in claim 3, in which the material forming said additional element is metal.

7. The pneumatic wheel as in claim 1, in which each seat of the rim into which is encased the corresponding bead has its opening turned in a radially outer direction with respect to the axis of rotation of the pneumatic wheel.

8. The pneumatic wheel as in claim 1, in which each seat of the rim encasing the corresponding bead has its opening turned towards the inner concavity of the pneumatic wheel.

9. The pneumatic wheel as in claim 1, in which the thickness of each seat of the rim encasing the corresponding bead defines at least one slit situated at the site of said additional element to permit its removal.

* * * * *